UNITED STATES PATENT OFFICE.

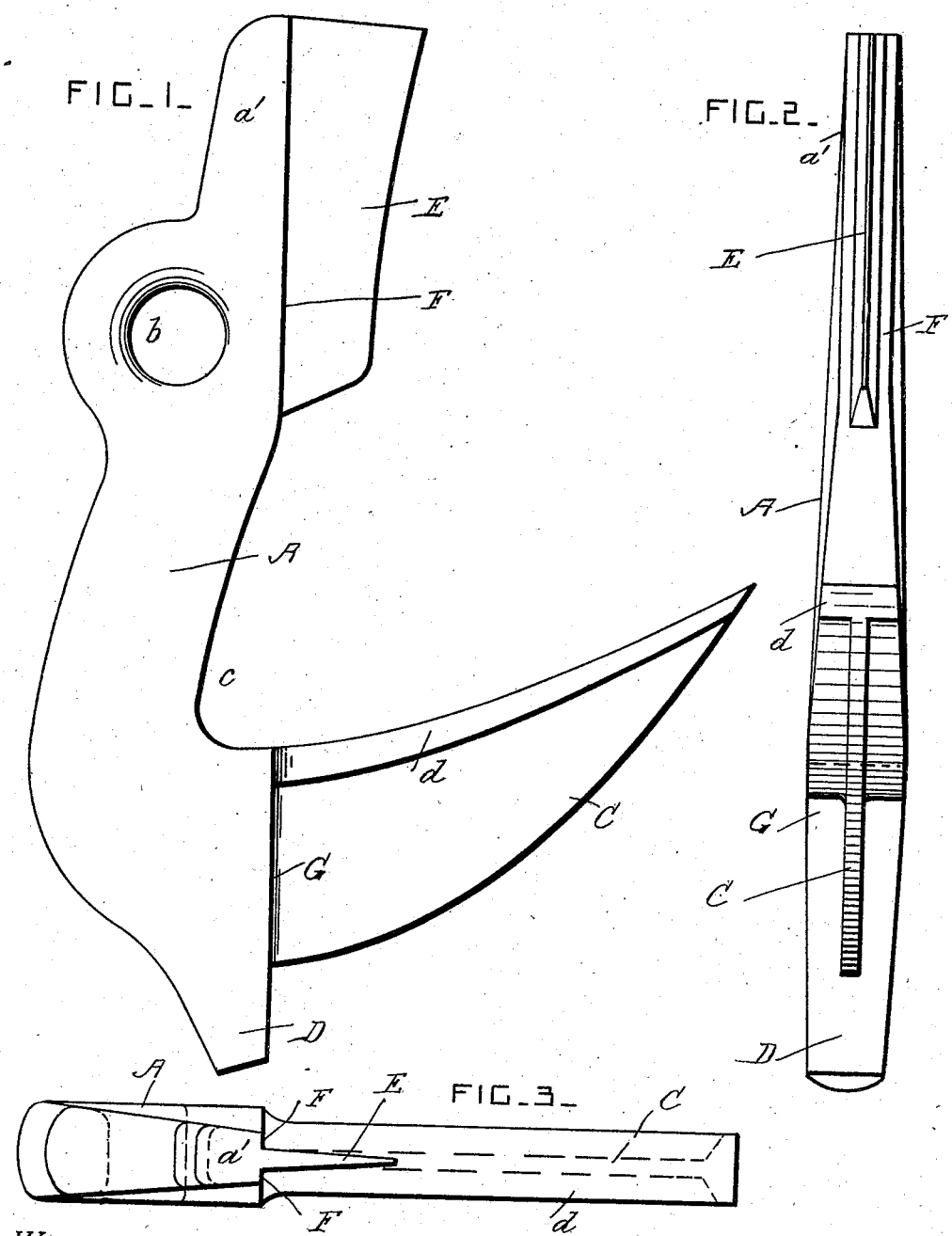

JOHN E. FLYNN, OF LOGUE, PENNSYLVANIA.

GRAB-HOOK.

No. 815,085.  Specification of Letters Patent.  Patented March 13, 1906.

Application filed August 29, 1905. Serial No. 276,214.

*To all whom it may concern:*

Be it known that I, JOHN E. FLYNN, a citizen of the United States, residing at Logue, in the county of Potter and State of Pennsylvania, have invented certain new and useful Improvements in Grab-Hooks; and I do hereby declare the following to be a full, clear, and exact description of the invention, such as will enable others skilled in the art to which it appertains to make and use the same.

This invention relates to grapples; and it consists of a grab-hook or logging-dog constructed as hereinafter fully described and claimed.

In the drawings, Figure 1 is a side view of the grab-hook. Fig. 2 is a front edge view of the grab-hook. Fig. 3 is a plan view of the grab-hook from above.

A is the shank of the grab-hook, which is provided with a hole $b$ for the draft attachment near one end of it.

C is a curved hook which projects from the lower end portion of the shank.

D is a spur or projection at the bottom of the lower part of the hook at the end of the shank.

E is a beveled blade or fin which extends longitudinally of the upper end portion of the shank and its extension $a'$, which projects on the other side of the hole $b$ from the hook. The blade or fin projects partially over the hook, and F represents shoulders on the shank and its extension at the base of the said blade or fin.

G represents shoulders on the shank at the base of the hook C. The shoulders F and G are arranged in line with each other, and the shank A of the hook is arranged at an angle to them, so that when the hook and the blade or fin are driven into a log up to the shoulders a space $c$ is left between the log and the shank.

The hook C is preferably flat and has parallel sides, and the inside edge of the hook is provided with projecting flanges or strengthening-ribs $d$. A hook constructed with flat sides in this manner does not split the wood as when it has tapering sides.

The grab-hook is used singly, in pairs, or otherwise to suit the requirements and is found to be very effective in handling logs of all sizes.

What I claim is—

1. A grab-hook provided with a shank having a curved hook at one end, said hook being formed with substantially flat and parallel sides and strengthening-ribs along its inside edge, a hole for the draft attachment in the said shank, and a blade or fin projecting from the shank adjacent to the said hole.

2. A grab-hook provided with a shank having a hole for a draft attachment, a blade or fin arranged longitudinally of the shank adjacent to the said hole, a curved hook projecting from the other end portion of the shank from the said blade or fin, and a spur projecting from the extreme end of the shank beyond the said hook.

3. A grab-hook provided with a shank having a curved hook at one end, a blade or fin arranged longitudinally of the said shank at its other end portion, and shoulders on the said shank at the bases of the said hook and blade, said shoulders being arranged in line with each other.

4. A grab-hook provided with a shank having a curved hook at one end, a blade or fin at its other end, and shoulders on the said shank at the bases of the said blade and hook, the said shank being arranged at an angle to the said shoulders and forming a space between them as set forth.

5. A grab-hook provided with a curved hook at one end, a hole for the draft attachment, and an extension which projects considerably beyond the said hole at the other end of the said shank, said extension having a long blade or fin projecting from it and having stop-shoulders on each side of the base of the said fin.

6. A grab-hook provided with a shank having a curved hook at one end, said hook having substantially flat and parallel sides and strengthening-ribs along its inside edge, a blade or fin at the other end portion of the said shank, and shoulders on the said shank at the bases of the said hook and blade.

In testimony whereof I have affixed my signature in the presence of two witnesses.

J. E. FLYNN.

Witnesses:
L. STARKWEATHER,
PAUL COSTA.